(12) United States Patent
Feit et al.

(10) Patent No.: US 10,402,161 B2
(45) Date of Patent: Sep. 3, 2019

(54) HUMAN-VEHICLE INTERACTION

(71) Applicant: Honda Motor Co., Ltd., Tokyo (JP)

(72) Inventors: Steven Feit, Dublin, OH (US); Ross C. Miller, Hilliard, OH (US); Jessica Champi, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 16 days.

(21) Appl. No.: 15/669,992

(22) Filed: Aug. 7, 2017

(65) Prior Publication Data

US 2018/0136902 A1     May 17, 2018

Related U.S. Application Data

(60) Provisional application No. 62/421,322, filed on Nov. 13, 2016.

(51) Int. Cl.
| | |
|---|---|
| *B60K 35/00* | (2006.01) |
| *G06F 3/14* | (2006.01) |
| *G06F 3/16* | (2006.01) |
| *G06F 3/01* | (2006.01) |
| *B60W 50/08* | (2012.01) |
| *G06F 3/0484* | (2013.01) |

(52) U.S. Cl.
CPC ............ *G06F 3/167* (2013.01); *B60W 50/08* (2013.01); *G06F 3/017* (2013.01); *G06F 3/04842* (2013.01)

(58) Field of Classification Search
None
See application file for complete search history.

(56) References Cited

U.S. PATENT DOCUMENTS

| | | |
|---|---|---|
| 5,757,268 A | 5/1998 | Toffolo et al. |
| 5,874,962 A | 2/1999 | de Judicibus et al. |
| (Continued) | | |

FOREIGN PATENT DOCUMENTS

| | | |
|---|---|---|
| EP | 2937771 | 10/2015 |
| GB | 2446468 | 8/2008 |
| (Continued) | | |

OTHER PUBLICATIONS

Office Action of U.S. Appl. No. 14/687,340, dated Oct. 2, 2018, 23 pages.

(Continued)

*Primary Examiner* — Adam D Tissot
(74) *Attorney, Agent, or Firm* — Rankin, Hill & Clark LLP

(57) ABSTRACT

According to one or more aspects, systems and methods for human-vehicle interaction are described herein. A touchpad may include a first touchpad zone and a second touchpad zone. A display may include a first display zone and a second display zone, which correspond to the first touchpad zone and the second touchpad zone, respectively. A processor may execute instructions stored on a memory to perform rendering a first application in a first mode within the first display zone of the display and rendering a second application in a second mode within the second display zone of the display. The processor, in response to an input from the touchpad, may render the already running second application in a first mode within the first display zone of the display and render the first application in a second mode within the second display zone of the display.

20 Claims, 9 Drawing Sheets

(56) References Cited

U.S. PATENT DOCUMENTS

| | | |
|---|---|---|
| 6,232,957 B1 | 5/2001 | Hinckley |
| 6,819,990 B2 | 11/2004 | Ichinose |
| 7,088,343 B2 | 8/2006 | Smith et al. |
| 7,126,581 B2 | 10/2006 | Burk et al. |
| 7,543,244 B2 | 6/2009 | Matthews et al. |
| 7,595,810 B2 | 9/2009 | Louch |
| 8,078,359 B2 | 12/2011 | Small et al. |
| 8,115,749 B1 | 2/2012 | Simpson |
| 8,188,969 B2 | 5/2012 | Morin et al. |
| 8,406,961 B2 | 3/2013 | Pathak et al. |
| 8,451,219 B2 | 5/2013 | Morin et al. |
| 8,504,936 B2 | 8/2013 | Gimpl et al. |
| 8,606,519 B2 | 12/2013 | Waeller |
| 8,677,284 B2 | 3/2014 | Aguilar |
| 8,711,115 B2 | 4/2014 | Ozawa et al. |
| 8,832,559 B2 | 9/2014 | Mentchoukov et al. |
| 8,860,676 B2 | 10/2014 | Higashi et al. |
| 8,892,299 B2 | 11/2014 | Small et al. |
| 8,907,778 B2 | 12/2014 | Waeller et al. |
| 9,024,975 B2 | 5/2015 | Dubs et al. |
| 9,032,292 B2 | 5/2015 | Lavallee |
| 9,052,925 B2 | 6/2015 | Chaudhri |
| 9,058,186 B2 | 6/2015 | Chaudhri |
| 9,116,594 B2 | 8/2015 | Hwang et al. |
| 9,285,944 B1 | 3/2016 | Penilla et al. |
| 2002/0060668 A1 | 5/2002 | McDermid |
| 2003/0043123 A1 | 3/2003 | Hinckley et al. |
| 2004/0150657 A1 | 8/2004 | Wittenburg et al. |
| 2004/0239622 A1 | 12/2004 | Proctor et al. |
| 2005/0149879 A1 | 7/2005 | Jobs et al. |
| 2005/0169503 A1 | 8/2005 | Howell et al. |
| 2006/0213754 A1 | 9/2006 | Jarrett et al. |
| 2007/0057922 A1 | 3/2007 | Schultz et al. |
| 2007/0136681 A1 | 6/2007 | Miller |
| 2007/0177803 A1 | 8/2007 | Elias et al. |
| 2007/0185631 A1 | 8/2007 | Yeh et al. |
| 2007/0220441 A1 | 9/2007 | Melton et al. |
| 2007/0256027 A1 | 11/2007 | Daude |
| 2008/0012831 A1 | 1/2008 | Bauman et al. |
| 2008/0168379 A1 | 7/2008 | Forstall et al. |
| 2008/0258995 A1 | 10/2008 | Vissenberg et al. |
| 2008/0313567 A1 | 12/2008 | Sabin et al. |
| 2010/0088634 A1 | 4/2010 | Tsuruta et al. |
| 2010/0188343 A1 | 7/2010 | Bach |
| 2011/0043468 A1 | 2/2011 | Lathrop et al. |
| 2011/0055741 A1 | 3/2011 | Jeon et al. |
| 2011/0169750 A1 | 7/2011 | Pivonka et al. |
| 2011/0175930 A1 | 7/2011 | Hwang et al. |
| 2012/0007823 A1 | 1/2012 | Ozawa et al. |
| 2012/0139858 A1 | 6/2012 | Simpson |
| 2012/0159380 A1 | 6/2012 | Kocienda et al. |
| 2012/0204131 A1 | 8/2012 | Hoang et al. |
| 2012/0254807 A1 | 10/2012 | Evans et al. |
| 2012/0317503 A1 | 12/2012 | Noh et al. |
| 2013/0014040 A1 | 1/2013 | Jagannathan et al. |
| 2013/0047105 A1 | 2/2013 | Jarrett et al. |
| 2013/0113726 A1 | 5/2013 | Tovar et al. |
| 2013/0120295 A1 | 5/2013 | Kim et al. |
| 2013/0132874 A1 | 5/2013 | He et al. |
| 2013/0140965 A1 | 6/2013 | Franklin et al. |
| 2013/0159900 A1 | 6/2013 | Pendharkar |
| 2013/0181941 A1 | 7/2013 | Okuno |
| 2013/0227419 A1 | 8/2013 | Lee et al. |
| 2013/0283212 A1 | 10/2013 | Zhu et al. |
| 2013/0311946 A1 | 11/2013 | Kwon |
| 2013/0317997 A1 | 11/2013 | Sjoblom |
| 2014/0026098 A1 | 1/2014 | Gilman |
| 2014/0049476 A1 | 2/2014 | Bragin |
| 2014/0062872 A1 | 3/2014 | Tanaka |
| 2014/0068518 A1 | 3/2014 | Liu et al. |
| 2014/0157163 A1 | 6/2014 | Strutin-Belinoff et al. |
| 2014/0229888 A1 | 8/2014 | Ko et al. |
| 2014/0309870 A1 | 10/2014 | Ricci et al. |
| 2015/0022475 A1 | 1/2015 | Watanabe et al. |
| 2015/0113455 A1* | 4/2015 | Kang ................. G06F 3/04842 715/765 |
| 2015/0135108 A1 | 5/2015 | Pope et al. |
| 2015/0224876 A1* | 8/2015 | Tsunoda ................ G06F 3/0482 345/2.2 |
| 2015/0234556 A1 | 8/2015 | Zhu et al. |
| 2015/0286393 A1 | 10/2015 | Wild et al. |
| 2015/0365306 A1 | 12/2015 | Chaudhri et al. |
| 2016/0062635 A1 | 3/2016 | Feit et al. |
| 2016/0085438 A1 | 3/2016 | Doan et al. |

FOREIGN PATENT DOCUMENTS

| | | |
|---|---|---|
| JP | 2013105425 | 5/2013 |
| JP | 5617783 | 11/2014 |

OTHER PUBLICATIONS

Search Report of German Application Serial No. 10 2017 219 332.8 dated May 17, 2018, 8 pages.

\* cited by examiner

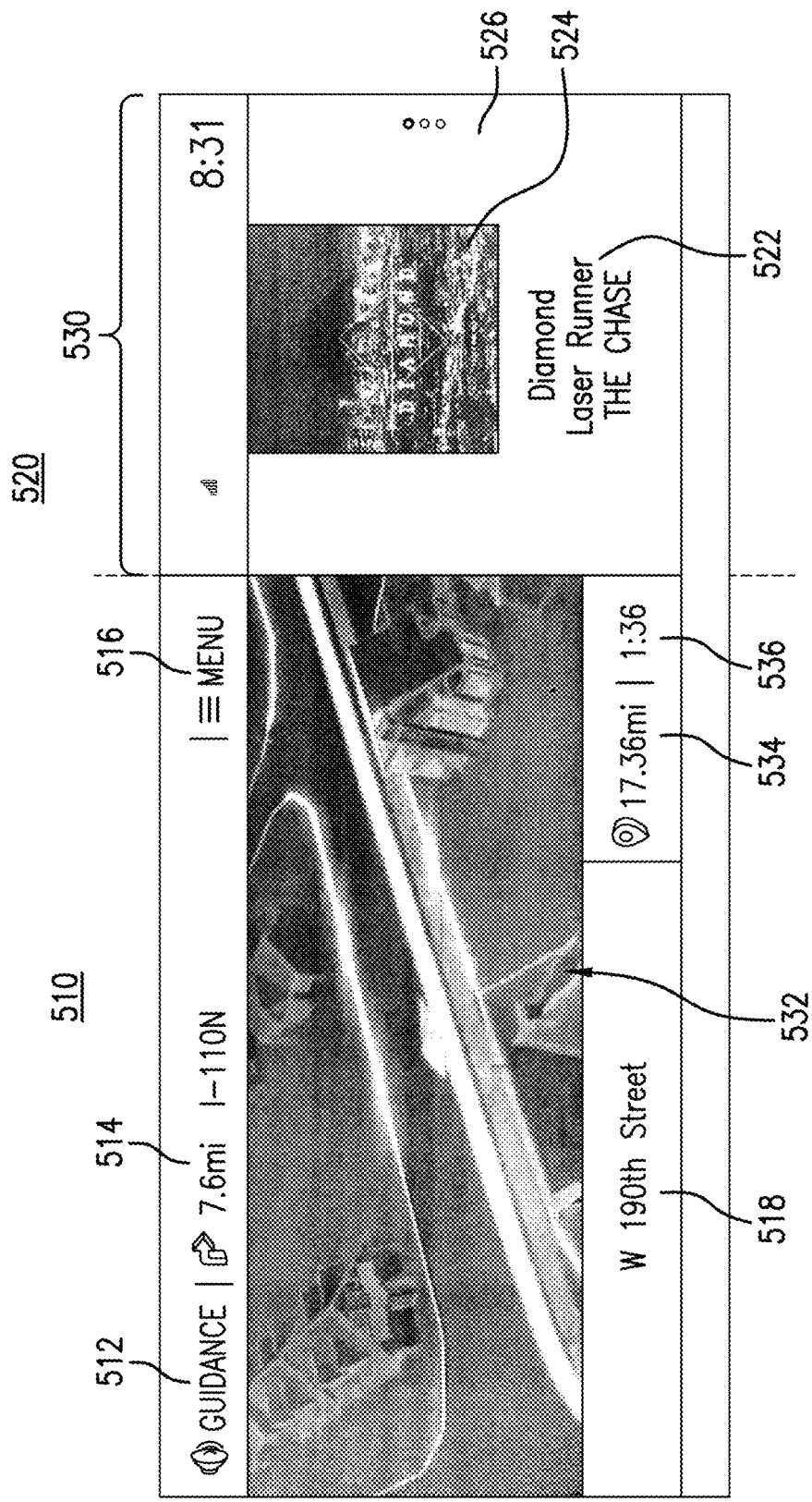

HUMAN-VEHICLE INTERACTION

CROSS-REFERENCE TO RELATED APPLICATIONS

This application claims the benefit of U.S. Provisional Patent Application Ser. No. 62/421,322 entitled "SYSTEM AND METHOD FOR HMI DESIGN AND HUMAN-VEHICLE INTERACTION", filed on Nov. 13, 2016; the entirety of the above-noted application(s) is incorporated by reference herein.

BACKGROUND

Generally, vehicles may be equipped with displays, such as center console displays, car dashboard displays (e.g., meter display), touch screen displays, or other displays. These displays may render vehicle information for a user, driver, passenger, or other occupant of a vehicle. Human machine interfaces (HMI) in the vehicle may facilitate interaction between a human (e.g., a driver, passenger) in the vehicle and the vehicle or associated vehicle systems. The user interface (UI) design of such systems may provide a self-explanatory, intuitive, efficient, or user-friendly way to operate the vehicle and/or to provide information.

BRIEF DESCRIPTION

According to one or more aspects, a system for human-vehicle interaction may include a touchpad, a display, a memory, and a processor. The touchpad may include a first touchpad zone and a second touchpad zone. The display may include a first display zone and a second display zone. The first display zone corresponds to the first touchpad zone and the second display zone corresponds to the second touchpad zone. The memory may store one or more instructions. The processor may execute one or more of the instructions stored on the memory to perform rendering a first application in a first mode within the first display zone of the display. The first mode may be an application mode. The processor may perform rendering a second application in a second mode within the second display zone of the display. The second mode may be a widget mode. The processor may receive an input from the touchpad indicative of launching the second application. In response to receiving the input from the touchpad, the processor may perform rendering the already running second application in a first mode within the first display zone of the display. The first mode may be an application mode associated with greater functionality than the widget mode of the second application. In response to receiving the input from the touchpad, the processor may perform rendering the first application in a second mode within the second display zone of the display.

The processor may render the first mode of the first application with a first interface and the second mode of the first application with a second interface arranged differently than the first interface. The touchpad may include a divider between the first touchpad zone and the second touchpad zone. The first touchpad zone and the second touchpad zone may be arranged at different heights. The first touchpad zone and the second touchpad zone may have different textures. The processor may render a graphic application identifier in the second display zone indicative of an order associated with the application currently being rendered in the second display zone. The input from the touchpad may be a click or a double tap in the second touchpad zone. The input from the touchpad indicative of launching the second application may be received while an icon associated with the second application is being rendered.

According to one or more aspects, a method for human-vehicle interaction may include rendering a first application in a first mode within a first display zone of a display, rendering a second application in a second mode within a second display zone of the display, receiving an input from a touchpad, wherein the touchpad includes a first touchpad zone and a second touchpad zone, rendering the second application in a first mode within the first display zone of the display in response to the input from the touchpad, and rendering a third application in a second mode within the second display zone of the display in response to the input from the touchpad based on the first application having no second mode and based on the input from the touchpad.

The third application may be a default application. The second application may be a default application and the third application may be a secondary default application. The method may include rendering the first mode of the second application with a first interface and the second mode of the second application with a second interface arranged differently than the first interface. The touchpad may include a divider between the first touchpad zone and the second touchpad zone. The first touchpad zone and the second touchpad zone may be arranged at different heights. The first touchpad zone and the second touchpad zone may have different textures. The method may include rendering a graphic application identifier in the second display zone indicative of an order associated with the application currently being rendered in the second display zone. The input from the touchpad may be a click or a double tap in the second touchpad zone. The method may include rendering an icon associated with the second application.

According to one or more aspects, a system for human-vehicle interaction may include a touchpad, a display, a memory, and a processor. The touchpad may include a first touchpad zone and a second touchpad zone. The display may include a first display zone and a second display zone. The first display zone may correspond to the first touchpad zone and the second display zone corresponds to the second touchpad zone. The memory may store one or more instructions. The processor may execute one or more of the instructions stored on the memory to perform rendering a first application in a first mode within the first display zone of the display. The first mode may be an application mode. The processor may perform rendering a second application in a second mode within the second display zone of the display. The second mode may be a widget mode. The processor may receive an input from the touchpad indicative of launching the second application. The processor, in response to receiving the input from the touchpad, may render the second application in a first mode within the first display zone of the display. The first mode may be an application mode associated with greater functionality than the widget mode of the second application. The processor, in response to receiving the input from the touchpad, may render a third application in a second, widget mode within the second display zone of the display. The third application may be an application associated with a first priority order.

The first priority order may be based on currently running applications. The processor may receive a second input from the touchpad indicative of launching the third application. In response to receiving the second input from the touchpad, the processor may perform rendering the third application in a first mode within the first display zone of the display. The first mode may be an application mode associated with greater functionality than the widget mode of the third application. In response to receiving the second input from the touchpad, the processor may perform rendering a fourth application in a second, widget mode within the second display zone of the display. The fourth application may be an application associated with a second priority order. The touchpad may include a divider between the first touchpad zone and the second touchpad zone. The first touchpad zone and the second touchpad zone may be arranged at different heights. The first touchpad zone and the second touchpad zone may have different textures.

BRIEF DESCRIPTION OF THE DRAWINGS

FIG. 5 is an illustration of a display and exemplary interfaces for a system for human-vehicle interaction, according to one or more embodiments.

DETAILED DESCRIPTION

Figure 1:
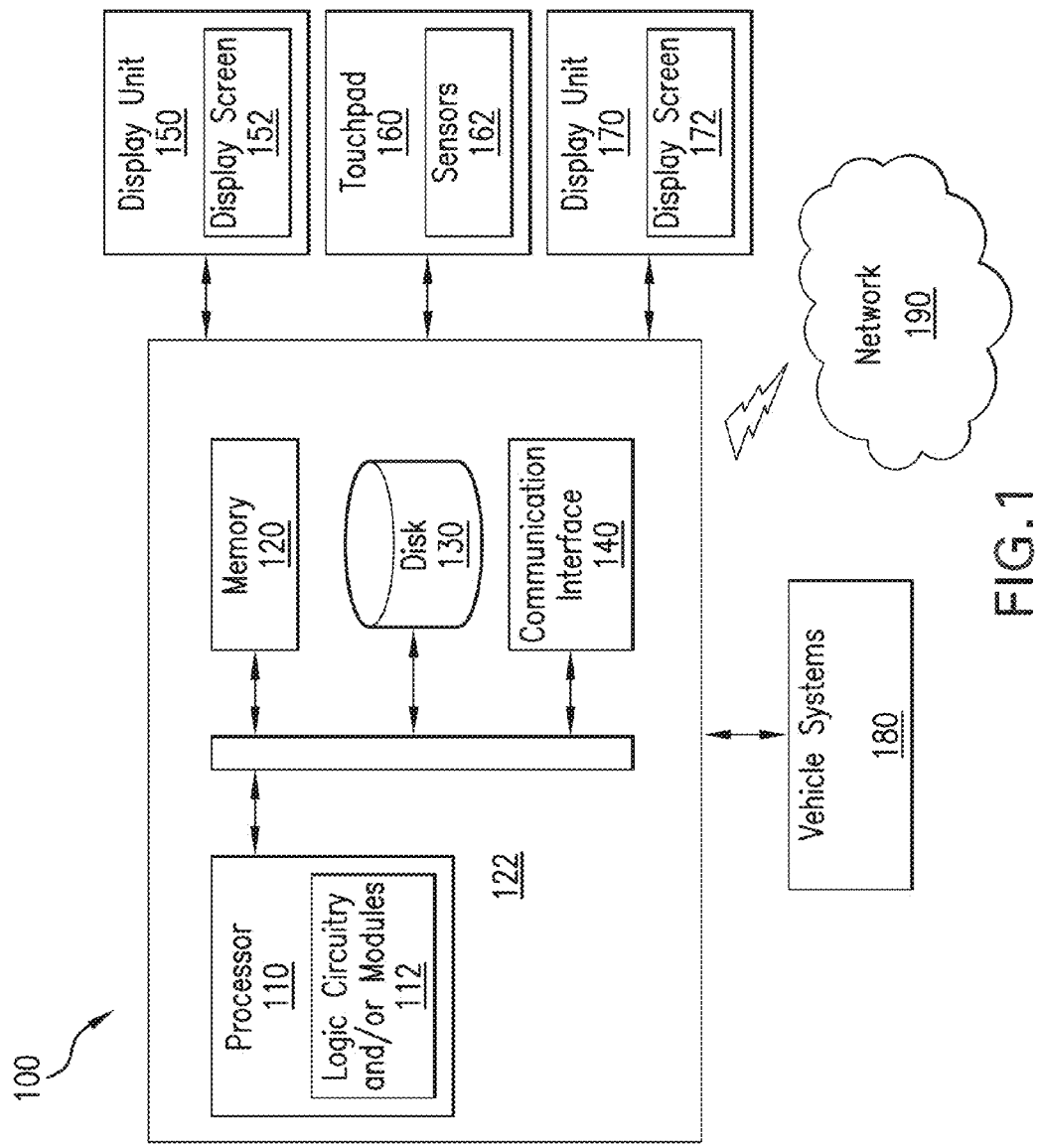
FIG. 1 is an illustration of an example system for human-vehicle interaction, according to one or more embodiments.

The following terms are used throughout the disclosure, the definitions of which are provided herein to assist in understanding one or more aspects of the disclosure. The definitions include various examples and/or forms of components that fall within the scope of a term and that may be used for implementation. The examples are not intended to be limiting.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others. As another example, the system of FIG. 1 may receive information from a mobile device by computer communication over the network or perform computer communication using the bus or the communication interface.

The processor may include a processing unit or microprocessors which execute instructions stored on the memory or the disk. A "processor", or "processing unit" as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

The "logic circuitry", as used herein, includes, but is not limited to, hardware, firmware, a non-transitory computer readable medium that stores instructions, instructions in execution on a machine, and/or to cause (e.g., execute) an action(s) from another logic circuitry, module, method, and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Conversely, where a single logic is described, it may be possible to distribute that single logic between multiple physical logics.

A "module", as used herein, includes, but is not limited to, a non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules. Examples of modules may include a display control module controlling displaying or rendering of one or more applications within one or more zones of a display unit or display screen, an input module or vehicle event module receiving one or more inputs from I/O devices, such as the touchpad, an application module running one or more applications on an operating system of the system for human-vehicle interaction, an application management module managing the priority, order, default order, widget train, or other execution related aspects of one or more of the applications, an image generation module generating visual feedback associated with input received from the I/O devices, and so on.

"Computer-readable medium" or "computer-readable device", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

The memory may include a volatile memory and/or a nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store one or more instructions which include an operating system that controls or allocates resources of a computing device, one or more applications, and so on.

The "disk", as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). Similarly to the memory, the disk may store one or more instructions which include an operating system that controls or allocates resources of a computing device, one or more applications, and so on.

A "database", as used herein, is used to refer to a table. In other examples, a "database" may be used to refer to a set of tables. In still other examples, a "database" may refer to a set of data stores and methods for accessing and/or manipulating those data stores. A database may be stored, for example, at the disk and/or the memory.

As seen in FIG. 1, the bus forms an operable connection between the processor, the memory, the disk, and the communication interface. The "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "vehicle", as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some scenarios, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may carry one or more human occupants. Further, the term "vehicle" may include vehicles that are automated or non-automated with pre-determined paths or free-moving vehicles.

A "vehicle display" or "display" (e.g., when used with reference to a display in a vehicle), as used herein may include, but is not limited to, LED display panels, LCD display panels, CRT displays, plasma display panels, touch screen displays, among others, that are often found in vehicles to display information about the vehicle, such as the display units of FIG. 1, which include display screens. The display may receive input (e.g., touch input, keyboard input, input from various other input devices, and so on.) from a user. The display may be located in various locations of the vehicle, for example, on the dashboard or center console. In some embodiments, the display is part of a portable device (e.g., in possession or associated with a vehicle occupant), a navigation system, an infotainment system, among others. For example, the display unit may be the center console display unit, while the display unit may be the dashboard display unit.

An "input/output device" (I/O device) as used herein may include devices for receiving input and/or devices for outputting data, such as the touchpad or the display unit. The touchpad may include sensors which enable the touchpad to detect a number of fingers a user is using or the touchpad to distinguish between multiple zones. The input and/or output may be for controlling different vehicle features which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware based controls, interfaces, touch screens, touch pads, or plug and play devices. An "output device" includes, but is not limited to: display devices, and other devices for outputting information and functions, such as the display units of the system of FIG. 1.

A "vehicle system", as used herein may include, but is not limited to, any automatic or manual systems that may be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

A 'widget' may be, for example, a small stand-alone application (or be associated with another application which may be run in different modes or have different interfaces with different configurations, functionalities, or arrangements) that includes a graphical user interface for displaying information and/or functions associated with one or more applications. Further, an application associated with a widget may be referred to as a 'parent application'. As an illustrative example, widgets may include a clock widget, a weather widget, an email widget, an audio widget, a phone widget, and so on.

As used herein, the term "infer", "inference", "predict", "prediction", "estimate", or "estimation" generally refer to the process of reasoning about or inferring states of a system, a component, an environment, a user from one or more observations captured via events or data, and so on. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

FIG. 1 is an illustration of an example system 100 for human-vehicle interaction, according to one or more embodiments. The system may include a processor 110, logic circuitry, one or more modules 112, a memory 120, a bus 122, a disk 130, a communication interface 140, a display unit 150 with a display screen 152, a touchpad 160 with one or more sensors 162, and a second display unit 170 with a second display screen 172 (e.g., other display). The system may interact with one or more vehicle systems 180 or receive information from other devices over a network 190 which enables computer communication.

Figure 2:
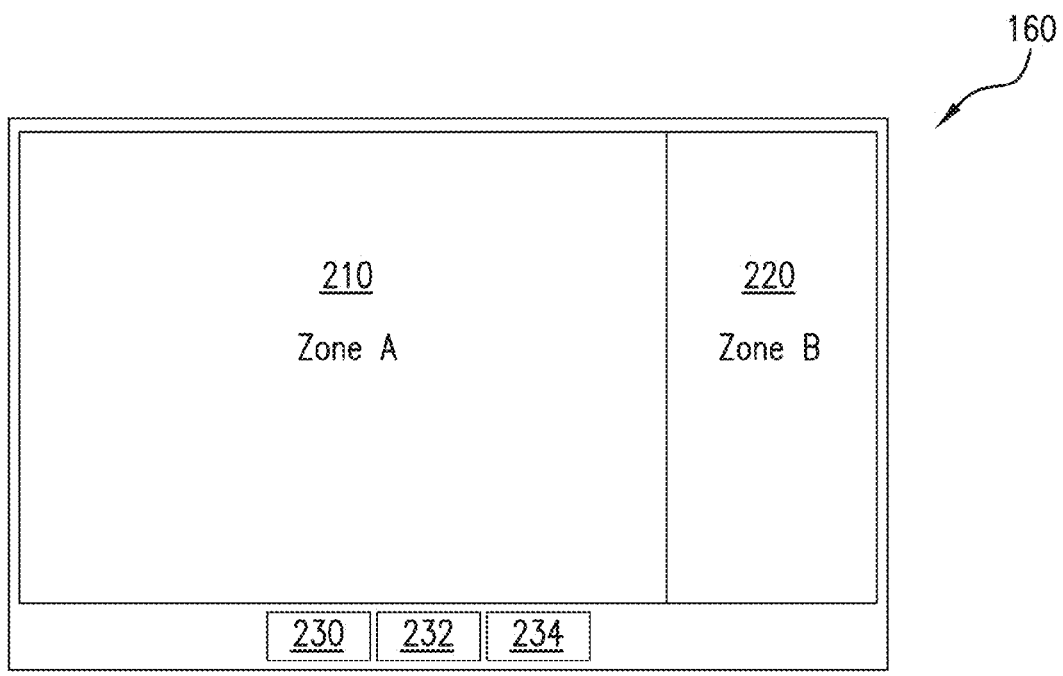
FIG. 2 is an illustration of an example touchpad for a system for human-vehicle interaction, according to one or more embodiments.
Figure 3:
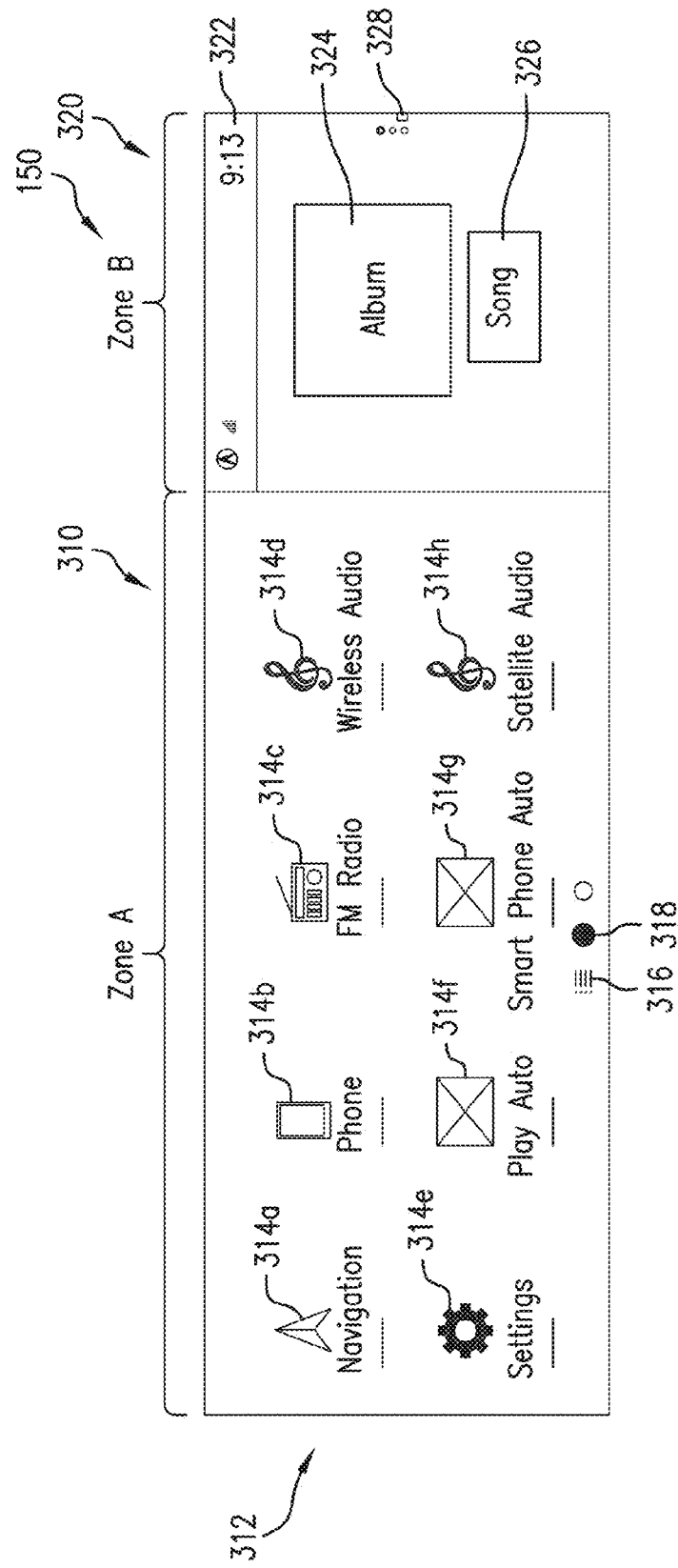
FIG. 3 is an illustration of a display and exemplary interfaces for a system for human-vehicle interaction, according to one or more embodiments.

FIG. 2 is an illustration of an example touchpad 160 for a system 100 for human-vehicle interaction, according to one or more embodiments. FIGS. 2-8 may be described with reference to one or more of the components (e.g., the processor 110, the memory 120, the display 150, the touchpad 160, and so on.) of the system 100 for human-vehicle interaction of FIG. 1. As seen in FIG. 2, the touchpad 160 includes a first touchpad zone 210 and a second touchpad zone 220. Here, the first touchpad zone 210 may be referred to as 'Zone A' (or the CA Zone', primary touchpad zone) and the second touchpad zone 220 may be referred to as 'Zone B' (or the CB Zone', secondary touchpad zone). Although merely two zones are illustrated, it will be appreciated that additional zones may be utilized in other embodiments. The first touchpad zone 210 corresponds to a first display zone of the display 150 and the second touchpad zone 220 corresponds to a second display zone of the display 150, as illustrated in FIG. 3, for example. In one or more embodiments, the touchpad 160 maps to or has a 1:1 correlation (or other correlation) with the display 150 or display screen 152.

The touchpad 160 may include a divider between the first touchpad zone 210 and the second touchpad zone 220 (e.g., the line or boundary between the two zones) which provides tactile differentiation between the respective zones. Because a single pointer or selection may be displayed on the display 150, the divider may be arranged to provide subtle tactile feedback when moving a finger or other appendage across the touchpad 160 between the first touchpad zone 210 and the second touchpad zone 220. In one or more embodiments, the first touchpad zone 210 and the second touchpad zone 220 may be arranged at different heights, thereby enabling the user to use their sense of feel to operate the touchpad 160 while driving. In other embodiments, the first touchpad zone 210 and the second touchpad zone 220 may have different textures or other characteristics which enable the user to distinguish between the respective zones while driving (without having to look at the touchpad 160 to distinguish the zones).

In one or more embodiments, the first touchpad zone 210 and the second touchpad zone 220 are clickable or the sensors 162 may sense a tap gesture at the first touchpad zone 210 or the second touchpad zone 220 and the processor 110 may interpret the tap gesture as a 'click'. In this way, the sensors 162 of the touchpad 160 may detect a click, a tap, a double tap, etc. or other gestures and the processor 110 may receive the user input and manage applications accordingly. In other embodiments, buttons may be provided at the touchpad 160, such as a left click button 230, a center click button 232, and a right click button 234.

In one or more embodiments, the processor 110 executes instructions stored on the disk 130 or the memory 120 to run an operating system which enables the use of 'apps' or applications (e.g., application programs, computing programs, or programs) to be run on the system 100 for human-vehicle interaction. In other words, the operating system enables the user to interact with or run applications which interact with the hardware of the vehicle or other hardware, such as a mobile device of the user. An example of the operating system may be seen in FIG. 3.

FIG. 3 is an illustration of a display and exemplary interfaces for a system 100 for human-vehicle interaction, according to one or more embodiments. As seen in FIG. 3, the display 150 or display screen 152 of the vehicle may be divided into multiple zones to promote multitasking of different applications. In this example, the first display zone 310 (e.g., primary task zone, Zone A, A Zone, and so on.) of the display 150 is on the left and the second display zone 320 (e.g., secondary task zone, Zone B, B Zone, and so on.) of the display 150 is rendered on the right. The first display zone 310 may be utilized to display active applications, while the second display zone 320 may be utilized to display other applications (e.g., applications associated with a different interface, rendered in a different size, applications in widget mode, applications which are running in the background, and so on.). In one or more embodiments, the first display zone 310 is associated with a larger area than the second display zone 320. Thus, the second display zone 320 may be utilized to display information which is useful, but not part of an application being displayed in the first display zone 310, thereby enabling multi-tasking of applications. As an example, the processor 110 may have the second display zone 320 display notifications.

In one or more embodiments, the memory 120 or the disk 130 of the system 100 for human-vehicle interaction may store instructions which are associated with one or more of the applications. For example, some of the instructions associated with a program or an application may, when executed by the processor 110, run the corresponding application in a first mode. Other instructions, when executed, may run the application in a second mode (e.g., a widget mode), third mode, and so on. According to one or more aspects, the processor 110 may select the mode in which to execute the application based on the zone in which the application is to be executed.

For example, the processor 110 may execute the application in a first mode when the application is running in the first display zone 310. As another example, the processor 110 may execute the application in a second mode when the application is running in the second display zone 320. However, when an application is rendered by the processor 110 in the first display zone 310 and the application is rendered as a widget in the second display zone 320, they are both associated with the same parent application. Stated another way, the processor 110 may run the application in application mode in the first display zone 310 and the same application in widget mode in the second display zone 320 (but not necessarily concurrently or simultaneously). As such, in one or more embodiments, it is unnecessary to display a widget in the second display zone 320 simultaneously or concurrently with its related parent application in the first display zone 310, although it may be possible in other embodiments.

The second mode or the widget mode of the application may be a compact version of the application in application mode. For example, the second mode or compact mode may have less or different functionality or options (rendered or visible) than a first mode of the application. Stated another way, an interface of the first mode of the application may be rendered differently than an interface of the second mode of the application. In one or more embodiments, the second mode of an application may be the mode that the application runs in when the application is inactive. In other embodiments, the second mode may be rendered to occupy a different amount of screen area than the first mode of the same application. However, it will be appreciated that 'hidden' commands may still be available while the widget is running in the second mode. For example, while no pause function is rendered on the second display zone 320 of FIG. 3, predefined user inputs (e.g., a press and hold gesture) at the second touchpad zone 220 received may cause the processor to pause audio associated with the audio application. Other examples of 'hidden' commands may include advancing to the next track with a left to right swipe in the second touchpad zone 220.

In any event, the processor 110 renders an operating system 312 in the first display zone 310 (e.g., Zone A) and an application in the second display zone 320 (e.g., Zone B). The processor 110 renders one or more icons on a home screen of the operating system 312 which may be selected by use of the first touchpad zone 210. One the home screen, different application icons 314a, 314b, 314c, 314d, 314e, 314f, 314g, and 314h are presented. In one or more embodiments, the interface of the operating system 312 may always have an active selection. In other words, one of the icons for a corresponding application or some portion of the screen is always or constantly selected, thereby mitigating the use of a mouse pointer, for example. In other embodiments, a pointer may be rendered by the processor 110 within the operating system 312 interface. Because multiple applications are available, multiple home pages may be rendered virtually adjacent to one another. For example, a two finger swipe to the left may result in the processor 110 rendering a second home screen with additional application icons (not shown). When the second home screen is rendered, a graphical home screen identifier 318 may be rendered by the processor 110 to indicate that the second home screen is being presented, rather than the first home screen. Further, additional options may be set or rendered when the options icon 316 is selected.

The application in the second display zone 320 of FIG. 3 may be an audio application, such as an USB audio application. Thus, the processor 110 renders information such as album information 324, song information 326, etc. within the second display zone 320. Other information may be rendered in the second display zone 320 regardless of the application rendered in the second display zone 320. For example, the time 322 may be rendered in the second display zone 320.

Widget Train

Additionally, the display control module of the processor 110 may queue applications for launch in the second display zone 320. In order to cycle through and view each widget or application in the second display zone 320 on the display screen 152, the user may use a swipe gesture on the surface of the touchpad 160 to scroll through the currently running widgets or applications. In other words, a vertical swipe input received at the second touchpad zone 220 may cause the processor 110 to render a different application in the second display zone 320 based on a predetermined order and one or more currently running applications within either the first display zone 310 or the second display zone 320.

The swipe gesture may include a swipe of at least a defined threshold length or a swipe in a predefined direction. In this way, the processor 110 may set multiple applications to be available in the second display zone 320 as a 'train' of tiles. Stated another way, the processor 110 may render an application in a second mode (e.g., in widget mode) in the second display zone 320 and enable a quick swap from that application to another application based on a predetermined order and based on suppressing applications which are already active. Thus, the visible screen area of the second display zone 320 may act as a lens, displaying one widget or application (running in a second mode) at a time. Based on user input from the touchpad 160, a scrolling input may cause the processor 110 to render a transition between applications in the widget train and render different widgets within the second display zone 320.

For example, if the processor 110 has application A running in the first display zone 310 in a first mode (e.g., application mode) and application B running in the second display zone 320 in a second mode (e.g., widget mode), and the predetermined order for the applications is A, B, C, to D, a downward swipe (e.g., from top to bottom) in the second touchpad zone 220 (corresponding to the second display zone 320) would result in the processor 110 rendering application D in the second mode because the downward swipe is associated with a 'scroll up' type command and also because application A is already currently running or being rendered in the first display zone 310, the processor 110 'skips' or suppresses the execution of a second instance of the already running or currently executing application A in the second display zone 320.

In other words, the processor 110 may adjust the list of applications or the widget train order based on a predetermined priority for the applications, a use history of the applications, or applications which are already being rendered in another display zone (e.g., first display zone 310 or elsewhere). Stated yet another way, the processor 110 may suppress the rendering of an application in the second display zone 320 based on another occurrence (e.g., active) of the application (e.g., regardless of the mode of the application) in another display zone (e.g., the first display zone 310) or on another display unit 170. In this way, the second display zone 320 may be used to display widgets or applications in a second mode which are not necessarily associated with an active application (e.g., application being rendered in the first display zone 310). As an example, the processor 110 may open a previously utilized application in place of the suppressed application.

Example Widget Train Order:

A
B
C
D

In one or more embodiments, the processor 110 'rolls' the display or rendering of programs so that if application D is being rendered on the second display zone 320 and an upward swipe (e.g., from bottom to top) is received in the second touchpad zone 220 (corresponding to the second display zone 320), the processor 110 renders application A (in the second mode) because the upward swipe is associated with a 'scroll down' type command and also because application A is circularly linked to the end of the widget train order. Stated another way, the applications are continuously linked from top to bottom such that when the bottom most application or widget is being displayed, a scroll down input causes the processor 110 to render the top most tile, application, or widget. The order of the widget train may be adjusted using a widget configuration application, for example.

In this way, the processor 110 may have the second display zone 320 render a 'train' of applications (e.g., widgets or applications in a second mode). The processor 110 may render a graphic application identifier 328 in the second display zone 320 which is indicative of an order associated with the application being rendered in the second display zone 320. For example, in FIG. 3, the graphic application identifier 328 is rendered to illustrate to a user that there are three applications in the 'widget train' (e.g., Application A, Application B, and Application C) and that Application A is the application being displayed. In FIG. 3, the graphic application identifier 328 includes three diamonds in a vertical row. The first diamond is highlighted, thereby indicating the first application in the widget train is currently displayed in the second display zone 320. Thus, a user may, at a glance, determine that three applications are currently available in the second display zone 320 and that the first application (e.g., application one of three) is the application being rendered in the second display zone 320.

As such, swipe inputs (or other types of inputs received at the touchpad 160 or the second touchpad zone 220) may cause the processor 110 to render the other applications (e.g., application two of three or application three of three) based on the direction of the swipe and whether one of the applications is already running in the first display zone 310, for example. When Application B or Application C are rendered within the second display zone 320 by the processor 110, the display control module of the processor 110 may update the graphic application identifier 328 to highlight the second or third diamond, thereby alerting the user that the second or third application of three applications is being displayed.

Application Priority

In one or more embodiments, the selection of one of the application icons from the home screen of the operating system 312 interface launches the corresponding application in the first display zone 310. For example, if the navigation icon is selected via user input from the touchpad 160 (e.g., a double tap or a click from the first touchpad zone 210 while the navigation icon is highlighted), the processor 110 may launch the navigation application in a first mode in the first display zone 310. After the navigation application is launched in the first display zone 310, the USB audio application remains in the second display zone 320, running in a second mode. An example of this is illustrated in FIG. 5.

As another example, if the USB audio application is running in a second mode in the second display zone 320 and the USB audio icon 314*d* is selected via user input from the touchpad 160 (e.g., a double tap or a click from the first touchpad zone 210 while the USB audio icon 314*d* is highlighted), the processor 110 may launch the USB audio application in a first mode in the first display zone 310, close the USB audio application (running in the second mode) in the second display zone 320, and launch a default application in the second display zone 320 in place of the USB audio application running in a second mode in the second display zone 320.

Figure 4:
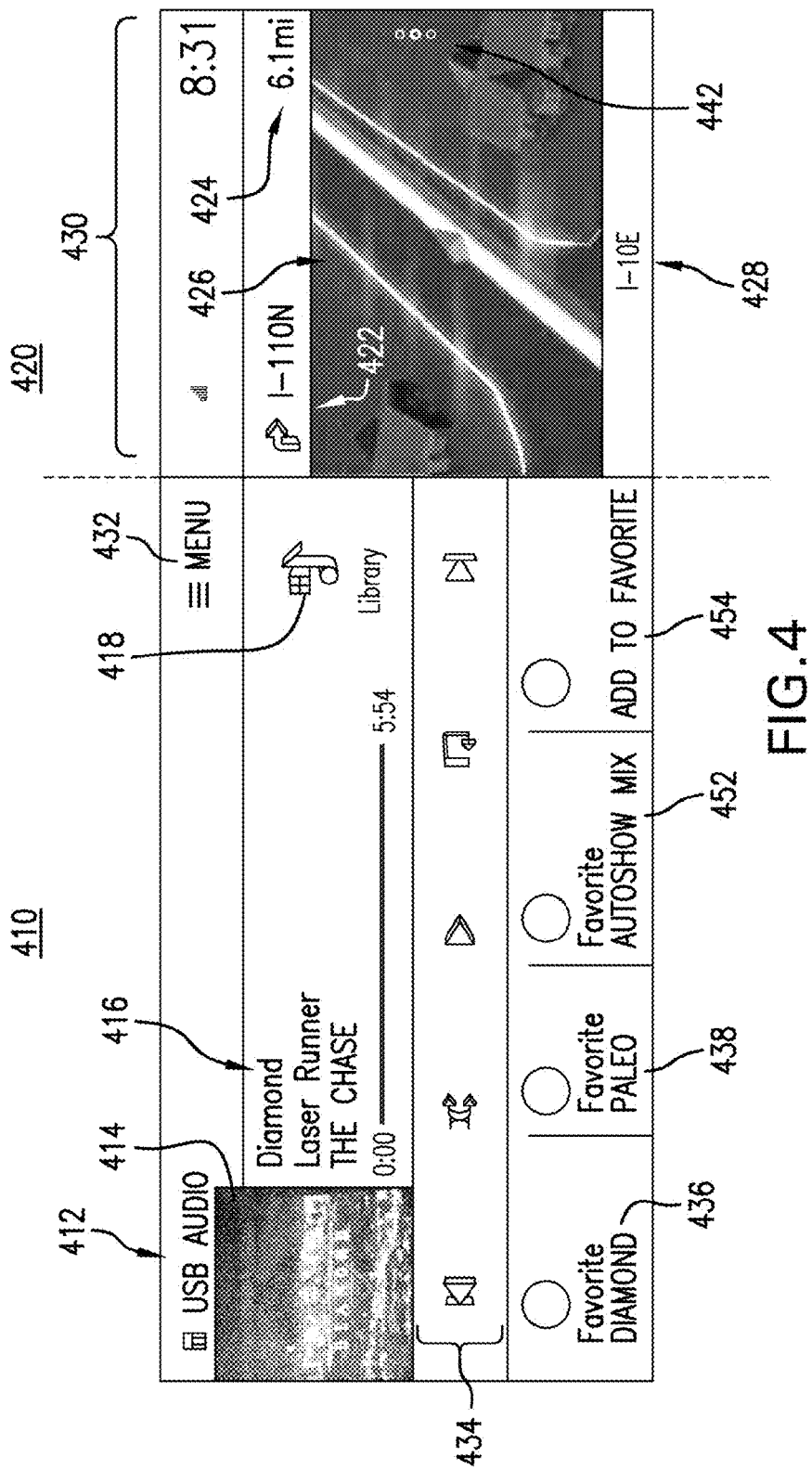
FIG. 4 is an illustration of a display and exemplary interfaces for a system for human-vehicle interaction, according to one or more embodiments.

Similarly, this may also occur based on an input from the second touchpad zone 220 selecting and expanding the application in the second display zone 320 (e.g., the USB audio application). After the USB audio application is launched in the first display zone 310, the default application (e.g., the default application may be a predetermined application, such as the navigation application) runs in the second display zone 320 in a second mode. An example of this is illustrated in FIG. 4. In this way, applications which are moved from one zone to another may be replaced by other applications based on a default priority list or default application order.

Explained another way, because the USB audio application is already running in the second display zone 320 in a second mode, selection of the same USB audio application from the first display zone 310 would not result in both display zones 310 and 320 running different modes of the same USB audio application, as this would be redundant. Instead, the USB audio application is launched in the first mode in the first display zone 310, and a default application is launched in the second display zone 320 in a second mode based on a default order of default applications and the currently rendered applications within the first display zone 310 (e.g., operating system 312) and the second display zone 320 (e.g., USB audio application).

As another example, if the default order of the default applications is A, B, C, and D, if Application Q is being rendered by the processor 110 in the first display zone 310, Application A will be the application rendered (e.g., in the second mode) in the second display zone 320. If Application A is selected via user input from the touchpad 160 (e.g., a double tap or a click from the second touchpad zone 220), Application B will automatically be the application rendered (e.g., in the second mode) in the second display zone 320 by the processor 110. If Application B is launched from the home screen of the operating system 312, Application A is the application rendered (e.g., in the second mode) in the second display zone 320 by the processor 110 because Application A is higher in the default order and not currently being rendered on either display zone 310 or 320. In one or more embodiments, the default order of the default applications may be based on the use history of one or more of the applications, one or more user preferences, and so forth. In this way, the configuration of the widget train or displaying of widgets in the second display zone 320 may be modified based on active parent applications.

For one or more of the figures herein, one or more boundaries may be drawn with different heights, widths, perimeters, aspect ratios, shapes, and so on. The boundaries are drawn relative to one another merely for illustrative purposes, and are not necessarily drawn to scale. Some boundaries may be imaginary or representative of virtual borders, such as the dashed lines in FIGS. 4-5. Because dashed or dotted lines may be used to represent different boundaries, if the dashed and dotted lines were to be drawn on top of one another they would not be distinguishable in the figures, and thus may be drawn with different dimensions or slightly apart from one another, in one or more of the figures, so that they are distinguishable from one another. Further, where a boundary is associated with an irregular shape, the boundary, such as a box drawn with a dashed line, dotted lined, etc. does not necessarily encompass an entire component in one or more embodiments. Conversely, a drawn box does not necessarily encompass merely an associated component, in one or more embodiments, but may encompass a portion of one or more other components as well.

The processor 110 may enable two or more applications to be run or executed in a simultaneous, concurrent, or parallel manner. Examples of this may be seen in FIGS. 4-5. The system 100 for human-vehicle interaction may enable a user, such as a driver of the vehicle, to interact or manage a configuration of two or more applications by providing user input through the touchpad 160. Examples of application management or human-vehicle interaction include swapping the position of the applications, resizing the applications, transforming an application from a first mode to a second mode (or from an application into a widget, increasing or decreasing functionality of the application), managing which application is active, scrolling through available applications, swapping positions of applications between portions of a single screen or multiple screens, rendering applications with different interfaces, and so on. Thus, the first display zone 310 and the second display zone 320 (e.g., of FIG. 3) may correspond to the first touchpad zone 210 and the second touchpad zone 220 of the touchpad 160 (e.g., of FIG. 2).

FIG. 4 is an illustration of a display and exemplary interfaces for a system 100 for human-vehicle interaction, according to one or more embodiments. In FIG. 4, it can be seen that a first application may be rendered in a first mode within the first display zone 410 of the display 150 and a second application may be rendered in a second mode within the second display zone 420 of the display 150. In this example, the first application is a USB audio application and the second application is a navigation application. Further, the first mode is an application mode and the second mode is a compact or widget mode. Because the USB audio application is in the first application mode, a command ribbon 434, and one or more suggestions 436, 438, 452, and 454 are shown. At the top of the first display zone 410, a graphic indicator 412 and a menu icon 432 are shown. Media information 414, 416, and 418 are rendered as part of the interface of the USB audio application. At the top of the second display zone 420, graphic indicators 430 are shown which are indicative of the time and signal strength. Graphic indicators 422, 424, 426, 428, and 442 illustrate information related to the navigation application.

Swapping Application Zones and Application Modes

In one or more embodiments, a selection of the second application (e.g., the navigation application) via a touch input from the second touchpad zone 220 of the touchpad 160 causes the processor 110 to render the second application in a first mode within the first display zone of the display 150 and the first application (e.g., USB audio application) in a second mode within the second display zone of the display 150. However, different scenarios, such as the selection of the application in the second display zone, may result in the transition of applications from the second display zone to the first display zone, thereby activating the application in the second display zone and sending the application in the first display zone to the background or the second display zone.

In this regard, FIG. 5 is an illustration of a display and exemplary interfaces for a system 100 for human-vehicle interaction, according to one or more embodiments. FIG. 5 will now be described in contrast or with reference to a transition from FIG. 4, where the applications are 'swapped' between the first display zone and the second display zone of respective figures.

In some scenarios, a user may wish to view the application of the second display zone in a larger or fuller mode. In this regard, the user may click or double tap the second touchpad zone 220, indicating the desire to expand the application from the second display zone. As a result of a touchpad input or in response to the touchpad input, the processor 110 may swap positions of applications between the first display zone and the second display zone. The processor 110 may further change the mode of an application from a first mode to a second mode or from the second mode to the first mode.

As seen in FIG. 5, the navigation application is rendered with a different interface than the navigation application of FIG. 4. Similarly, the USB audio application of FIG. 5 is rendered with a different interface than the USB audio application of FIG. 4. The first display zone 510 is associated with the navigation application and the second display zone 520 is associated with the USB audio application.

In FIG. 5, the USB audio application has less functionality rendered than the USB audio application of FIG. 4 in that merely the artist and song information 522 and 524 are rendered while the command ribbon 434 and suggestions 436, 438, 452, and 454 are rendered in FIG. 4. However, the graphic indicator 430 did not change from FIG. 4 to FIG. 5 at 530. In one or more embodiments, the application name 512 is rendered alongside the menu icon 516. Some aspects of the navigation application interface of FIG. 5 are similar to the navigation application interface of FIG. 4, such as the turn by turn navigation graphic indicator 514 or the graphic indicators 442 and 526, while additional information may be provided by graphic indicators 518, 532, 534, and 536 in FIG. 5.

Thus, because the different modes of the same application of FIG. 4 and FIG. 5 are rendered with different interfaces, each arranged different from one another, in the different display zones, a different level of functionality, level of detail, or information is provided between the different display zones.

The transition from FIG. 4 to FIG. 5 on the display unit 150 may be based on the USB audio application having a second mode. In some scenarios, the USB audio application may not have a second mode. In these scenarios, the default application from the default application list or default application order may be utilized. For example, if an input from the touchpad 160 is received while the first application is running in a first mode in the first display zone and the second application is running in a second mode in the second display zone, but one of the applications does not have the other mode (e.g., the first application has no second mode), the processor 110 may execute or launch a third application (e.g., a default application from a list of default applications using a default order) in a second mode within the second display zone of the display 150 (e.g., based on the first application having no second mode). In one or more embodiments, the default order may be based on user application history or user preferences. For example, the most launch applications may be the highest on the order of default applications.

Further, when one of the applications already rendered on the first display zone or the second display zone is already the default application, a secondary default application may be used when needed. In other words, in response to the input from the touchpad 160, the processor 110 may perform rendering of a third application in a second mode within the second display zone of the display 150 based on the first application having no second mode when the second application already running is the default application and the third application is a secondary default application. In this way, default applications may be launched when applications have no associated alternative modes (e.g., second mode).

Figure 6A:
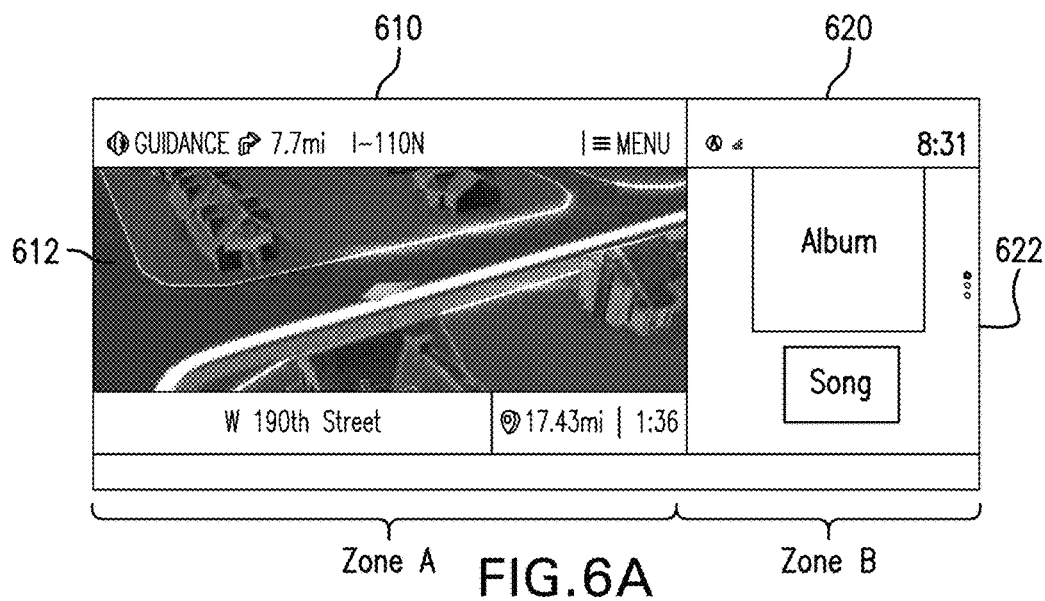
FIG. 6A-6C are illustrations of a display and exemplary interfaces for a system for human-vehicle interaction, according to one or more embodiments.
Figure 6B:
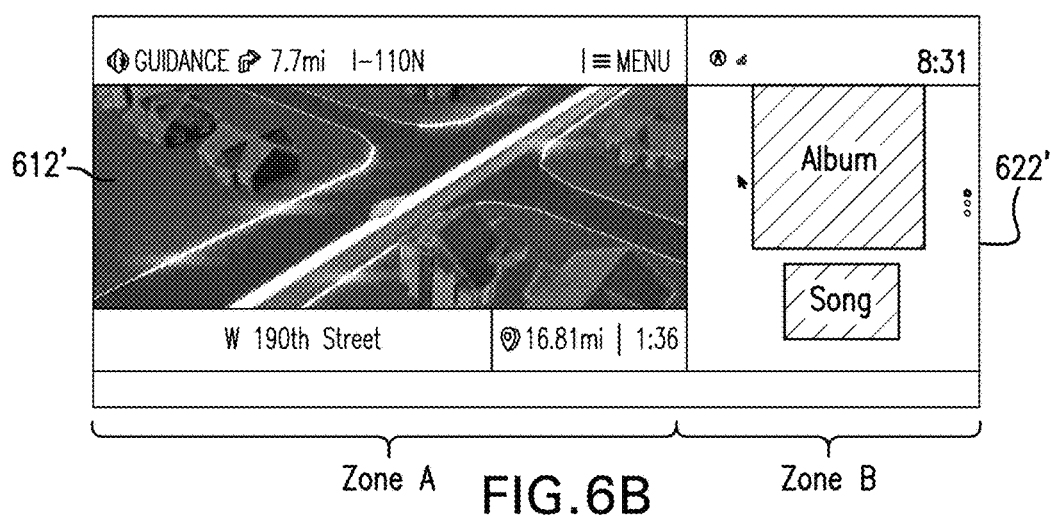
Figure 6C:
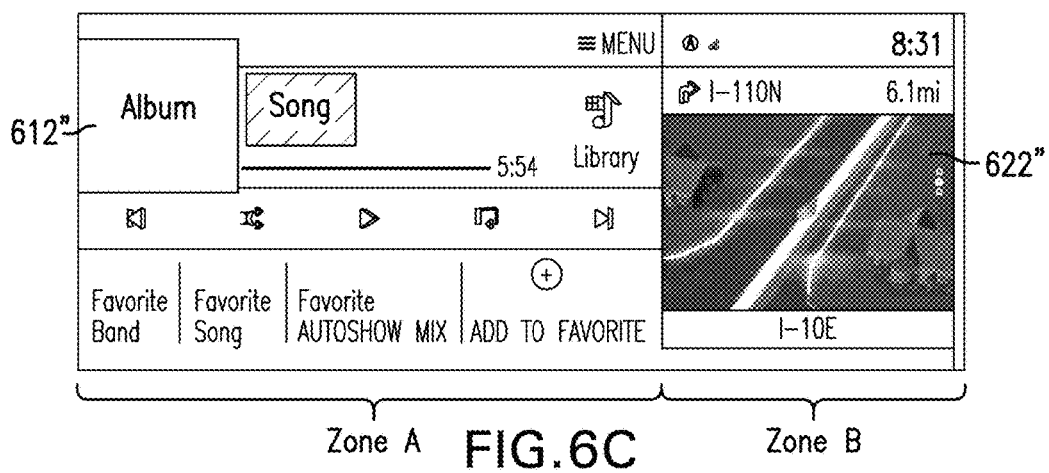

FIG. 6A-6C are illustrations of a display and exemplary interfaces for a system 100 for human-vehicle interaction, according to one or more embodiments. In FIGS. 6A-6C, a transition occurs between the applications of the first display zone 610 and the second display zone 620. In FIG. 6A, a navigation application 612 is rendered by the processor 110 in the first display zone 610 and an audio application 622 is rendered in the second display zone 620. In FIG. 6B, the navigation application continues running 612' and a portion of the audio application 622' is highlighted to illustrate that a corresponding user input has occurred at the touchpad 160 (e.g., within the second touchpad zone 220) or otherwise provide visual feedback that the touchpad 160 is being engaged. For example, an image generation module of the processor 110 may generate visual feedback associated with input received from the touchpad 160 and the processor 110 may render the feedback in a position on the display screen 152 which corresponds to the position of the input from the touchpad 160. This visual highlight provides feedback to the user indicating control over the content or the application in the second display zone of the display screen 152.

In one or more embodiments, the color, hue, or intensity of the visual feedback may be proportional to the pressure applied on the touchpad 160 or a length of time the input is received. In other embodiments, the color, hue, or intensity of the visual feedback may be varied to enable the user to quickly spot the location of the input on the display screen 152. In FIG. 6C, the audio application 612" is swapped to the first display zone 610 and the navigation application 622" is swapped to the second display zone 620 based on the touch input from the touchpad 160 (e.g., in contrast to FIGS. 6A-6B).

FIG. 7A-7D are illustrations of a display and exemplary interfaces for a system 100 for human-vehicle interaction, according to one or more embodiments.

Figure 7A:
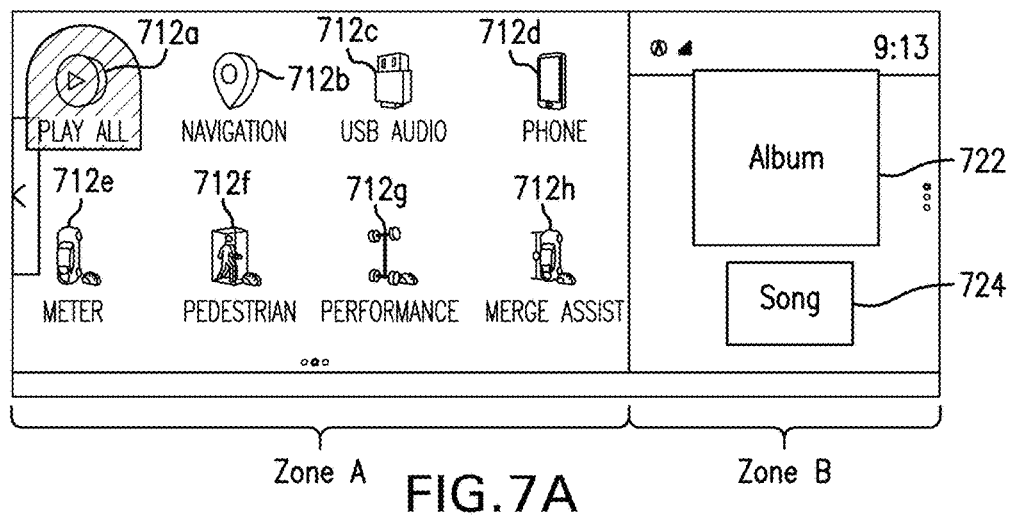
FIG. 7A-7D are illustrations of a display and exemplary interfaces for a system for human-vehicle interaction, according to one or more embodiments.
Figure 7B:
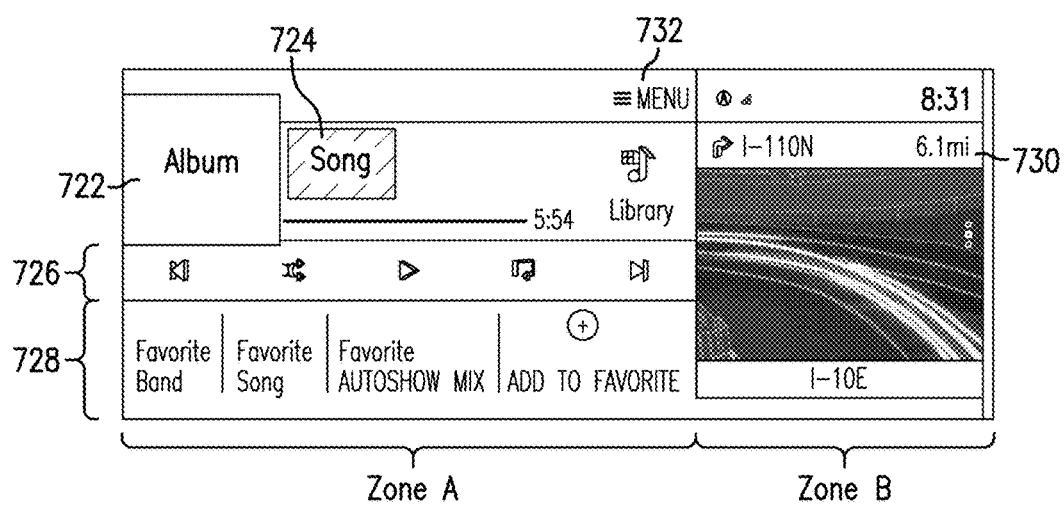

In FIGS. 7A-7B, an operating system is at a home screen in the first display zone 710 and an audio application is rendered in the second display zone 720. Graphic indicators 722 and 724 display information related to the audio application. On the home screen, different application icons 712a, 712b, 712c, 712d, 712e, 712f, 712g, and 712h are presented. If the application icon 712a for the audio application is selected while the audio application is running in the second display zone 720, the processor 110 transforms the audio application from a second mode to a first mode and renders the audio application in the first display zone 710 along with additional commands 726 and 728 while keeping graphic indicators 722 and 724. Because the audio application is moved from the second display zone 720 to the first display zone 710, a replacement application (e.g., default application 730) is launched by the processor 110. At 732, a menu options icon is provided.

Figure 7C:
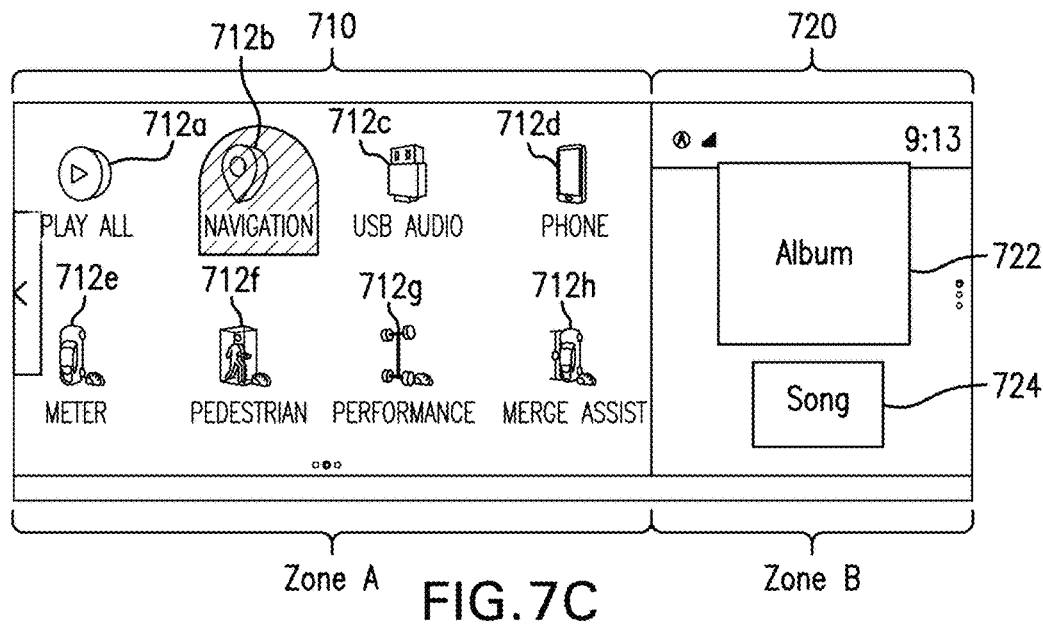
Figure 7D:
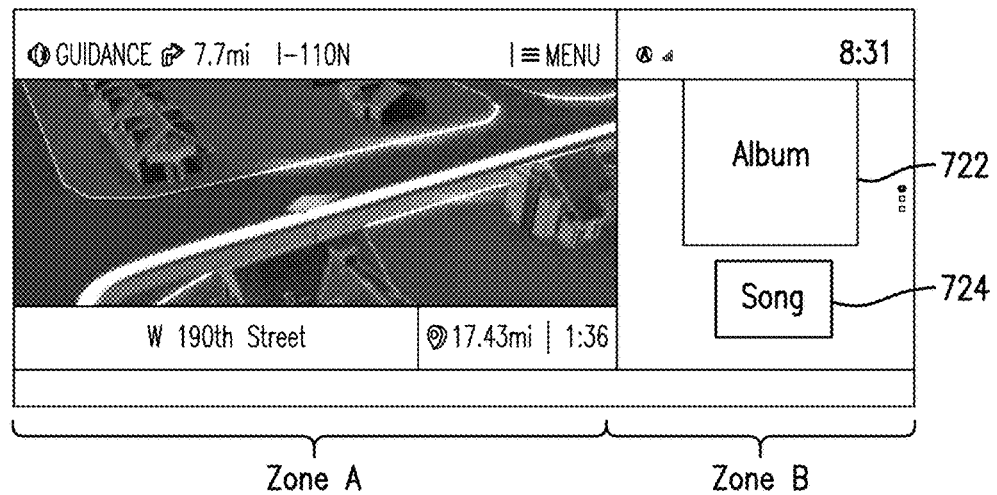

In FIGS. 7C-7D, an operating system is at a home screen in the first display zone 710 and an audio application is rendered in the second display zone 720. Graphic indicators 722 and 724 display information related to the audio application. On the home screen, different application icons 712a, 712b, 712c, 712d, 712e, 712f, 712g, and 712h are presented. If the application icon 712a for the navigation application is selected while the audio application is running in the second display zone 720, the processor 110 launches the navigation application in the first display zone 710 and keeps the audio application in the second display zone 720.

Figure 8:
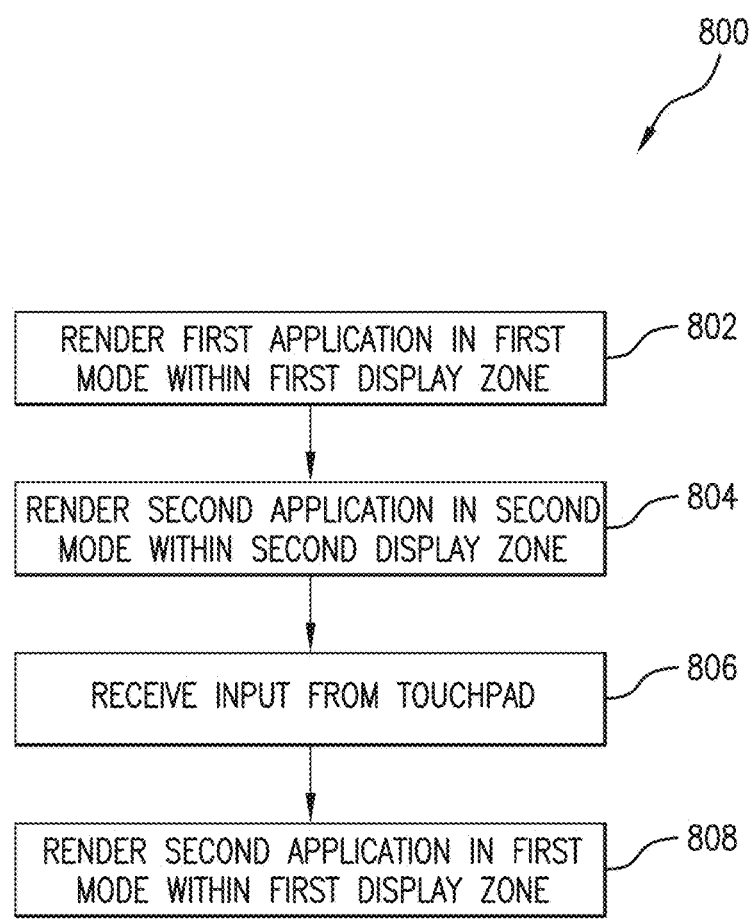
FIG. 8 is an illustration of an example flow diagram of a method for human-vehicle interaction, according to one or more embodiments.

FIG. 8 is an illustration of an example flow diagram of a method 800 for human-vehicle interaction, according to one or more embodiments. The method 800 may include rendering a first application in a first mode within a first display zone at 802. This may be an application in application mode within a primary task zone of a display screen, for example. The method 800 may include rendering a second application in a second mode within a second display zone of the same display screen at 804. The second mode of the second application may be a widget mode. Thus, a second, different application may be running in the second display zone as a widget or a compact version of the application. The method 800 may include receiving an input from a touchpad, such as a touch input representative of a tap, a double tap, or a click from a second touchpad zone which corresponds to the second display zone at 806. In response, the method 800 may include rendering the second application in a first mode within the first display zone, thereby effectively moving the second application from the second display zone to the first display zone, and transforming the second application from a widget into an application at 808.

One or more embodiments may employ various artificial intelligence (AI) based schemes for carrying out various aspects thereof. One or more aspects may be facilitated via an automatic classifier system or process. A classifier is a function that maps an input attribute vector, x=(x1, x2, x3, x4, xn), to a confidence that the input belongs to a class. In other words, f(x)=confidence (class). Such classification may employ a probabilistic or statistical-based analysis (e.g., factoring into the analysis utilities and costs) to prognose or infer an action that a user desires to be automatically performed.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, and so on. Rather, such terms are merely used as identifiers, names, etc. for features, elements, items, and so on. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for human-vehicle interaction, comprising:
   a touchpad including a first touchpad zone and a second touchpad zone;
   a display including a first display zone and a second display zone, wherein the first display zone corresponds to the first touchpad zone and the second display zone corresponds to the second touchpad zone;
   a memory storing one or more instructions; and
   a processor executing one or more of the instructions stored on the memory to perform:
   rendering a first application in a first mode within the first display zone of the display, wherein the first mode is an application mode;
   rendering a second application in a second mode within the second display zone of the display, wherein the second mode is a widget mode;
   receiving an input from the touchpad indicative of launching the second application; and
   in response to the input from the touchpad, which is separate from the display:
   rendering the already running second application in a first mode within the first display zone of the display, wherein the first mode is an application mode associated with greater functionality than the widget mode of the second application, and wherein the first display zone and the second display zone occupy an entire area of the display; and
   rendering the first application in a second mode within the second display zone of the display in a manner where the first application swaps display zones with the second application.

2. The system of claim 1, wherein the processor renders the first mode of the first application with a first interface and the second mode of the first application with a second interface arranged differently than the first interface.

3. The system of claim 1, wherein at least one of:
   the touchpad includes a divider between the first touchpad zone and the second touchpad zone;
   the first touchpad zone and the second touchpad zone are arranged at different heights; or
   the first touchpad zone and the second touchpad zone have different textures.

4. The system of claim 1, wherein the processor renders a graphic application identifier in the second display zone indicative of an order associated with the application currently being rendered in the second display zone.

5. The system of claim 1, wherein the input from the touchpad is a click or a double tap in the second touchpad zone.

6. The system of claim 1, wherein the input from the touchpad indicative of launching the second application is received while an icon associated with the second application is being rendered.

7. A method for human-vehicle interaction, comprising:
   rendering a first application in a first mode within a first display zone of a display;
   rendering a second application in a second mode within a second display zone of the display;
   receiving an input from a touchpad, wherein the touchpad includes a first touchpad zone and a second touchpad zone;
   rendering the second application in a first mode within the first display zone of the display in response to the input from the touchpad, which is separate from the display; and
   rendering a third application in a second mode within the second display zone of the display in response to the input from the touchpad based on the first application having no second mode and based on the input from the touchpad, wherein the first display zone and the second display zone occupy an entire area of the display.

8. The method of claim 7, wherein the third application is a default application.

9. The method of claim 7, wherein the second application is a default application and the third application is a secondary default application.

10. The method of claim 7, comprising rendering the first mode of the second application with a first interface and the second mode of the second application with a second interface arranged differently than the first interface.

11. The method of claim 7, wherein at least one of:
    the touchpad includes a divider between the first touchpad zone and the second touchpad zone;
    the first touchpad zone and the second touchpad zone are arranged at different heights; or
    the first touchpad zone and the second touchpad zone have different textures.

12. The method of claim 7, comprising rendering a graphic application identifier in the second display zone indicative of an order associated with the application currently being rendered in the second display zone.

13. The method of claim 7, wherein the input from the touchpad is a click or a double tap in the second touchpad zone.

14. The method of claim 7, comprising rendering an icon associated with the second application.

15. A system for human-vehicle interaction, comprising:
    a touchpad including a first touchpad zone and a second touchpad zone;
    a display including a first display zone and a second display zone, wherein the first display zone corresponds to the first touchpad zone and the second display zone corresponds to the second touchpad zone;
    a memory storing one or more instructions; and
    a processor executing one or more of the instructions stored on the memory to perform:
    rendering a first application in a first mode within the first display zone of the display, wherein the first mode is an application mode;
    rendering a second application in a second mode within the second display zone of the display, wherein the second mode is a widget mode;
    receiving an input from the touchpad indicative of launching the second application; and
    in response to the input from the touchpad, which is separate from the display:
    rendering the second application in a first mode within the first display zone of the display, wherein the first mode is an application mode associated with greater functionality than the widget mode of the second application, and wherein the first display zone and the second display zone occupy an entire area of the display; and
    rendering a third application in a second, widget mode within the second display zone of the display, wherein the third application is an application associated with a first priority order.

16. The system of claim 15, wherein the first priority order is based on currently running applications.

17. The system of claim 15, wherein the processor receives a second input from the touchpad indicative of launching the third application.

18. The system of claim 17, wherein in response to the second input from the touchpad, the processor performs:
- rendering the third application in a first mode within the first display zone of the display, wherein the first mode is an application mode associated with greater functionality than the widget mode of the third application; and
- rendering a fourth application in a second, widget mode within the second display zone of the display.

19. The system of claim 18, wherein the fourth application is an application associated with a second priority order.

20. The system of claim 15, wherein at least one of:
- the touchpad includes a divider between the first touchpad zone and the second touchpad zone;
- the first touchpad zone and the second touchpad zone are arranged at different heights; or
- the first touchpad zone and the second touchpad zone have different textures.

* * * * *